Figure 1:
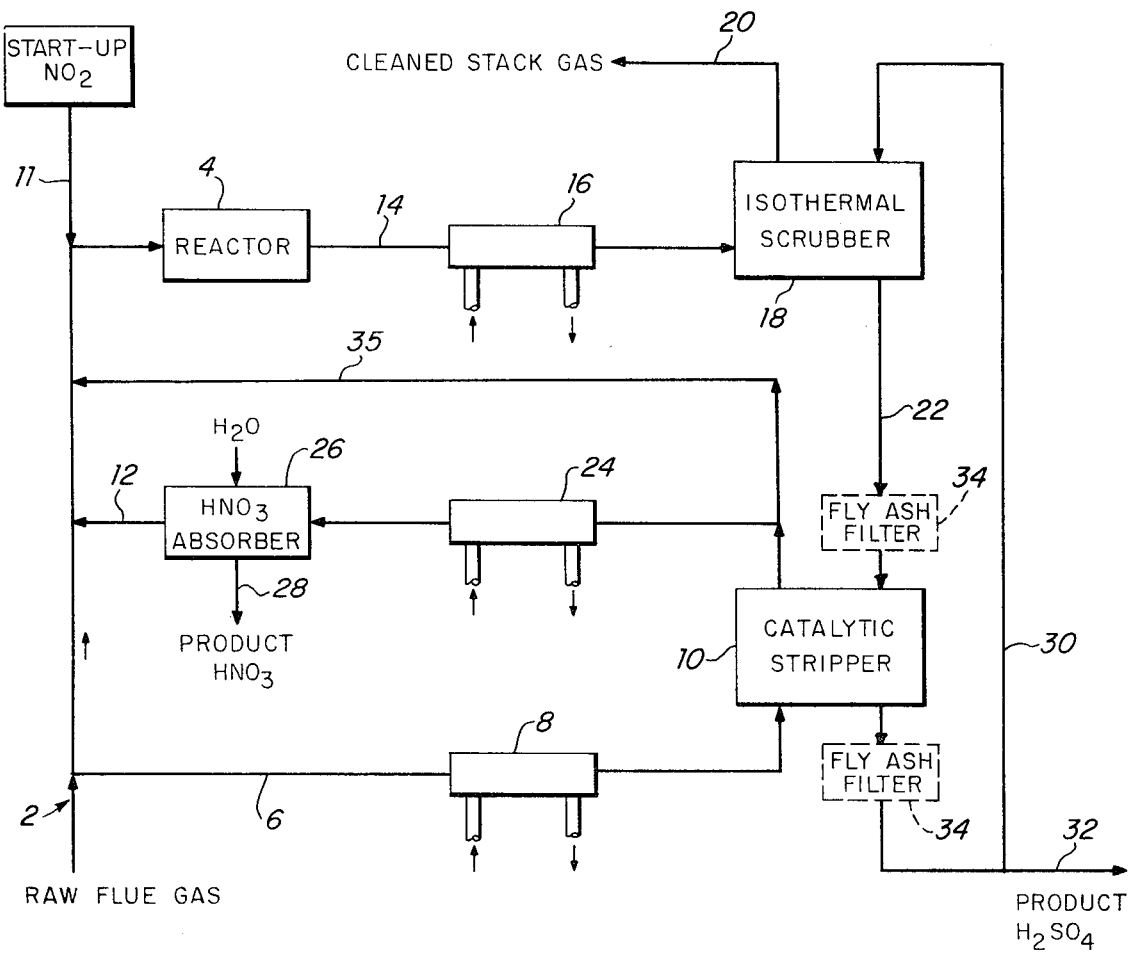

United States Patent
Keilin et al.

[15] 3,649,188
[45] Mar. 14, 1972

[54] METHOD OF CONVERTING SULFUR DIOXIDE TO SULFURIC ACID

[72] Inventors: Bertram Keilin, Newtonville; Arthur L. Walitt, West Concord, both of Mass.

[73] Assignee: The United States of America as represented by the Secretary of Health, Education and Welfare

[22] Filed: Mar. 24, 1970

[21] Appl. No.: 22,246

[52] U.S. Cl. ..................................23/167, 23/2 SQ, 23/157
[51] Int. Cl. ......................................C01b 17/82
[58] Field of Search ....................23/167, 168, 160 A, 203 N, 23/157, 160, 178, 2 SQ

[56] References Cited

UNITED STATES PATENTS

| 3,451,776 | 6/1969 | Van Dijk et al. | 23/167 X |
| 3,519,388 | 7/1970 | Rinckhoff | 23/167 |
| 892,516 | 7/1908 | Halvorsen | 23/167 X |
| 1,617,212 | 2/1927 | Lamoreaux | 23/168 |
| 1,822,447 | 9/1931 | Merriam | 23/168 |
| 3,398,009 | 8/1968 | Deery | 23/209.1 X |

FOREIGN PATENTS OR APPLICATIONS 1,423,122 11/1965 France..............................23/157

OTHER PUBLICATIONS

Dvecker, " The Manufacture of Sulfuric Acid," pp. 104– 107, 111– 113 (Reinhold 1959)

Primary Examiner—Oscar R. Vertiz
Assistant Examiner—Charles B. Rodman
Attorney—Schiller & Pandiscio

[57] ABSTRACT

A modification of the Lead Chamber Process for producing sulfuric acid from gas streams containing sulfur dioxide. The process involves oxidizing the $SO_2$ content of the gas stream with $NO_2$ to form $SO_3$ which is contacted with water vapor to form sulfuric acid, scrubbing the gas stream with sulfuric acid, catalytically oxidizing the nitrogen oxide-bearing sulfuric acid (nitrose) to convert the nitrogen oxides to $NO_2$, recycling the $NO_2$ produced by the catalytic oxidation for use in oxidizing additional $SO_2$, separating sulfuric acid from the catalytic oxidation stage, and recycling part of the separated sulfuric acid to the gas scrubbing stage while recovering the remainder as product. The feed gas stream may be an industrial flue gas or an off-gas from a sulfur or pyrites burner.

24 Claims, 2 Drawing Figures

BERTRAM KEILIN
ARTHUR L. WALITT
INVENTORS.

METHOD OF CONVERTING SULFUR DIOXIDE TO SULFURIC ACID

This invention was developed under a contract with the U.S. Department of Health, Education and Welfare.

This invention relates to a modification of the Lead Chamber Process for producing sulfuric acid.

The primary object of this invention is to provide an improved process for producing sulfuric acid from industrial flue gases or $SO_2$-bearing gases obtained by burning sulfur or pyrites.

Another important object of this invention is to provide a new process and apparatus system for desulfurizing industrial flue gases with low $SO_2$ concentration and relatively high water content.

Another leading object of this invention is to manufacture both sulfuric and nitric acids by conversion of the sulfur oxide and nitrogen oxide values in flue gases.

Still a further object is to reduce the size of the lead chambers by effecting the reoxidation of nitric oxide rapidly and in another stage of the process system.

A more specific object is to provide a process for converting $SO_2$ to sulfuric acid, characterized by catalytic conversion of oxides of nitrogen to $NO_2$ which is then used as the $SO_2$ oxidant.

Another specific object is to convert the sulfur oxide and nitrogen oxide pollution components of flue gases to sulfuric acid and nitric acid respectively by a new method which involves high temperature scrubbing of the reacted chamber gas and catalytic oxidation to recover $NO_2$ from a solution of $N_2O_3$ in $H_2SO_4$.

The foregoing and other objects are achieved by a process which as applied to a flue gas can be summarized as follow: Raw flue gas containing sulfur dioxide and nitrogen oxides is contacted with a stream of $NO_2$ which oxidizes the $SO_2$ to $SO_3$. The latter forms sulfuric acid through contact with water vapor. The reacted gases pass through a sulfuric acid scrubber which removes the newly formed sulfuric acid and the oxides of nitrogen while venting the scrubbed, wet flue gas to the atmosphere at a relatively high temperature to assure easy dissipation. The nitrogen oxide-bearing sulfuric acid (nitrose) from the scrubber is passed to a stripper where it is contacted with a side stream of the raw flue gas under catalytic conditions whereby the nitrogen oxides are converted to $NO_2$ in the liquid phase with the flue gas providing the necessary oxygen. Part of the effluent flue gas stream from the stripper which contains the $NO_2$ is processed to recover excess $NO_2$ as nitric acid, and then it and the remainder of the effluent gas from the stripper is mixed with the main flue gas stream so that its regenerated $NO_2$ content can produce further $SO_2$ oxidation. Some of the denitrated sulfuric acid leaving the stripper is recovered as product while the remainder is recycled to the sulfuric acid scrubber. Some $NO_2$ is introduced to the system when it is started up and thereafter the $NO_2$ required to oxidize the $SO_2$ content of the flue gas is recovered from the system and recycled. The process also can be modified for production of sulfuric acid using $SO_2$-bearing gases obtained by burning sulfur or pyrites.

Figure 2:
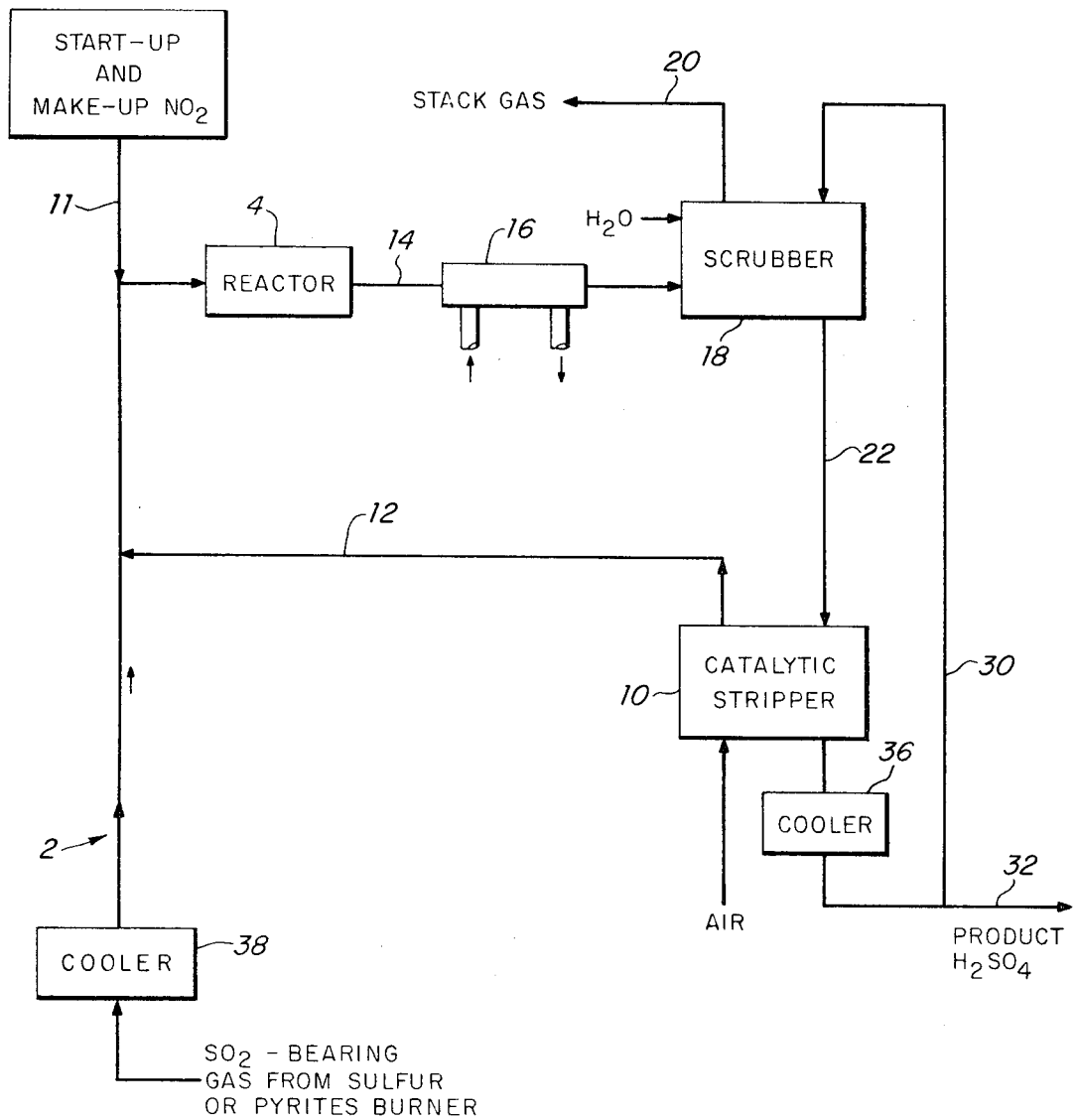

Other objects and features and many of the attendant advantages are described or rendered obvious by the following detailed description which is to be considered together with the accompanying drawing wherein:

FIG. 1 illustrates a system for desulfurizing wet flue gases that constitutes a preferred embodiment of the invention; and FIG. 2 illustrates a modification of the invention adapted for producing sulfuric acid from $SO_2$-bearing gases obtained by burning sulfur or pyrites.

Referring now to FIG. 1, the illustrated system is described in the following detailed description of the process as used to desulfurize flue gases.

Flue gas from a suitable source, such as the flue stack of an electrical power plant (not shown), is introduced to the system by way of an inlet line 2. Most of the flue gas is delivered to a reactor 4 but a portion thereof is delivered as a side stream via a branch line 6 to one end of a catalytic stripper 10. A heat exchanger 8 may be included in line 6 to bring the flue gas to the operating temperature of the stripper. Nitrogen dioxide, as required for startup purposes, is introduced to the reactor 4 from a suitable source of supply via a line 11. Also connected to the line 2 are the lines 12 and 35 which continuously add to the mainstream of flue gas flowing to the reactor 4 a stream of recycle $NO_2$ which is derived from the stripper 10 in a manner hereinafter described. In the reactor 4 the recycle $NO_2$ rapidly oxidizes the $SO_2$ in the flue gas mainstream to $SO_3$ which in turn is converted to sulfuric acid as a result of contact with water vapor in the combined gas streams. The quantities of $NO_2$ and NO in the recycle stream are adjusted so that the fully reacted gas effluent from reactor 4 contains equimolar quantities of NO and $NO_2$. The reacted gases pass from reactor 4 via a line 14 and a heat exchanger 16 to a scrubber 18 where it is scrubbed with recycle sulfuric acid to effect removal of sulfuric acid and oxides of nitrogen. Exchanger 16 is operated so as to bring the reacted gases to the temperature level of scrubber 18. The scrubbed, wet stack gas is vented to the atmosphere at a relatively high temperature via a line 20 while the nitrogen oxide-bearing sulfuric acid (hereinafter referred to as "nitrose") is passed via a line 22 to the catalytic stripper 10 where it contacts the flue gas side stream and a selected catalyst. In this preferred embodiment the catalyst in the stripper 10 is activated charcoal. In the stripper, the oxides of nitrogen are catalytically oxidized to $NO_2$ with the sidestream of the flue gas providing the required oxygen. The gas stream from the stripper, containing $NO_2$ and flue gas is separated into two streams, the larger of which is delivered via line 35 back into the mainstream of flue gas in line 2. The other smaller stream is passed through a cooling unit 24 to a nitric acid absorber 26 which may be a conventional water scrubber. In the absorber 26 the scrubbing water converts excess $NO_2$ (equivalent to the nitrogen oxides which entered with the flue gas less what exits scrubber 18 in the vented stack gas) to nitric acid. The latter is recovered and passed to storage via a line 28. The scrubbed gas stream from scrubber 26 is delivered via line 12 into the line 2 where it is mixed with the mainstream of flue gas for further use in $SO_2$ oxidation. Part of the sulfuric acid fraction recovered in stripper 10 is recycled to scrubber 18 via line 30 while the remainder (equal to the amount of sulfuric acid formed by reaction of $SO_2$ with $NO_2$ and $H_2O$) is removed as product via line 32.

The effect of fly ash on the operation of the process is minimal. For one thing most power plants have some type of dust collecting system to strip fly ash from the stack gas before it is vented to the atmosphere, so that in most cases the amount of fly ash is quite small and is no problem. However, it is appreciated that there may be cases where the flue gas contains an appreciable amount of fly ash. If the sulfuric acid product is to be used in situations where a relatively pure acid is not required, e.g., in the fertilizer industry, the fly ash can still be ignored, in which case it is scrubbed out in scrubber 18 and will appear in the sulfuric acid product. On the other hand, if a relatively pure sulfuric acid product is desired, the fly ash can be removed by treating the flue gas directly or by filtering the acid by means of a filter 34 interposed between scrubber 18 and stripper 18 or after the stripper.

The purpose of reactor 4 is to provide sufficient volume and thereby residence time to allow the oxidation of $SO_2$ in the mainstream of flue gas to take place according to the following reaction:

$$SO_2 + NO_2 \rightarrow SO_3 + NO \quad (1)$$

The $SO_3$ quickly reacts with the water vapor present in the flue gas to form sulfuric acid according to the following reaction:

$$SO_3 + H_2O \rightarrow H_2SO_4 \quad (2)$$

The sulfuric acid is formed as a mist which remains in the flue gas stream. Sulfuric acid mist at low concentrations is not easily condensed and hence very little of it will condense in the reactor. High yields for the oxidation of $SO_2$ to $SO_3$ have been obtained in relatively short reaction times, e.g., in the order of 5 seconds. Also since the total heat of reaction is quite small in the dilute gas stream, the gas temperature undergoes only a small rise, typically in the order of 40 degrees, as a result of the oxidation reaction. Therefore the requirement of the standard Chamber Process for large heat dissipating chambers does not exist with this process and the reactor 4 may be relatively small or even eliminated if the length and size of the line 2 from the junction with line 12 to the cooling unit 16 offers sufficient volume to provide the residence time required to allow oxidation of $SO_2$ to occur according to reaction (1) above.

The reacted flue gas entering acid scrubber 18 is made up of inert gases, sulfuric acid mist, water vapor, and NO and $NO_2$. The amount of recycle $NO_2$ introduced to the mainstream of flue gas via lines 12 and 35 is adjusted so that the reacted flue gases entering scrubber 18 contains equimolar quantities of NO and $NO_2$. This requirement is because individually NO and $NO_2$ are virtually insoluble in sulfuric acid while together they combine with sulfuric acid to form nitrosylsulfuric acid according to the following reaction:

$$NO_2 + NO + 2H_2SO_4 \rightarrow 2HNSO_5 + H_2O \qquad (3)$$

The combination of $NO_2$ and NO may be represented as the intermediate $N_2O_3$. Nitrosylsulfuric acid is a crystalline material which is soluble in sulfuric acid up to 60 percent by weight. Accordingly when the reacted flue gases are contacted with sulfuric acid in scrubber 18, the sulfuric acid mist and the nitrogen oxides react to form a solution of nitrosylsulfuric acid which is scrubbed out by the recycled sulfuric acid.

An important feature of the invention is controlling the amount of water scrubbed out of the reacted flue gases in the acid scrubber 18. The typical raw flue gas contains more water vapor than is needed to make sulfuric acid from its $SO_2$ constituent. The mole ratio of water to $SO_2$ in the flue gas, for example, may be in the order of 25:1. Hence if the reacted flue gas stream is scrubbed with cold (80° F.) sulfuric acid as in the standard Chamber Process, all of the water vapor will be absorbed by the acid and the latter will be so dilute as to require reconcentration before being recycled to the scrubber. Reconcentration not only requires additional equipment but also is an expensive heat-consuming process. This problem of acid dilution is avoided by scrubbing the reacted gases with hot sulfuric acid. The temperature of the scrubbing acid is set in accordance with the water content of the flue gas and the concentration of the scrubbing acid. The less the water content and the lower the acid concentration, the lower the scrubbing acid temperature. More specifically the scrubber column is run isothermally at a temperature where the vapor pressure of water over the incoming acid is equal to the partial pressure of water in the incoming gas with the result that very little or no water vapor is scrubbed out of the reacted gases in scrubber 18 and the recycle acid will leave the scrubber at substantially the same concentration as it entered. By way of example, for 80 percent recycle acid and a reacted flue gas stream containing 7.3 percent water, the scrubber temperature must be about 250° F. to avoid scrubbing of water vapor and dilution of the recycle acid. Substantially all (99 percent) of the sulfuric acid mist and the oxides of nitrogen may be removed from the reacted flue gases in the scrubber if scrubbed with sulfuric acid at 250° F. Operating the scrubber at temperatures above 80° F. and below 250° F. does not substantially affect the amount of sulfuric acid mist that is scrubbed but merely the amount of dilution of the acid by scrubbed water vapor. Of course, the scrubber may be operated above 250° F., but it should not exceed that temperature at which the vapor pressure of sulfuric acid becomes high enough to cause an undesirable amount of the acid vapor to be contained in the effluent gas stream vented to the atmosphere via line 20. This upper limit depends on the sulfuric acid concentration. As a practical matter, the scrubber temperature, i.e., the temperature of the scrubbing acid, is kept below about 400° F. at atmospheric pressure.

Since the solubility of nitrosylsulfuric acid in sulfuric acid increases with sulfuric acid concentration, it is possible to operate the scrubber with high strength recycle acid. However, the recycle acid strength must not be so high as to cause at the operating temperature an undesirable amount of sulfuric acid vapor to be carried out of scrubber 18 with the effluent gas. In this connection it is to be noted that as the recycle acid strength is increased, the operating temperature of the scrubber also must be increased in order to maintain the vapor pressure of the water vapor over the acid equal to the water vapor's partial pressure in the reacted flue gases entering the scrubber. The maximum acid strength that may be used in wet flue gas cleanup is about 93 percent where the operating temperature is about 400° F., since at higher concentrations and, therefore, higher operating temperature, the vapor pressure of sulfuric acid is high enough to cause an undesirable amount of sulfuric acid vapor to be carried out of the system in the effluent gas. A standard Chamber Process plant cannot be efficiently operated with 93 percent recycle sulfuric acid because of the difficulty with that process in recovering oxides of nitrogen from a nitrose of greater than 80 percent sulfuric acid content.

The catalytic stripping that occurs in stripper 10 provides an operating advantage over the Lead Chamber Process where nitrogen oxide recovery is effected by diluting the nitrose with dilute sulfuric acid and heating it with hot sulfur-combustion gases. The diluting and heating of the nitrose causes an increase in the vapor pressure of the nitrogen oxides, but this method is impractical when treating acid of concentration of 80 percent or more because of the need for a large amount of heat beyond that which is supplied by the feed gas in order to vaporize the nitrogen oxides. The present invention avoids the need for additional heat by contacting the nitrose with an oxidizing catalyst in the presence of oxygen, whereby the nitrogen oxides are oxidized to $NO_2$ in the liquid phase and are recovered in a relatively small amount of carrier feed gas. Since the oxides of nitrogen are easily soluble in sulfuric acid only in equimolar quantities of nitric oxide and nitrogen dioxide, the oxidation of the nitric oxide values to nitrogen dioxide by means of a rapid catalytic reaction will cause the oxide molar ratio to deviate from unity, with the resultant evolution of the nitrogen dioxide from solution being far more rapid than would be possible by vapor pressure considerations alone. The exact mechanism of this oxidation reaction is not understood for certain, but the net effect is that the total nitrogen oxide content of the nitrose is converted to nitrogen dioxide which is picked up by the carrier gas, i.e., the sidestream of flue gas and delivered to the reacter, in part via the nitric acid absorber 26. The flue gas side stream leaving the catalytic stripper is used to supply sufficient nitrogen dioxide to the mainstream of flue gas to ensure that the ratio of nitric oxide (the oxides of nitrogen in the typical flue gas are primarily in the form of nitric oxide) to nitrogen dioxide is unity or substantially so by the time the reacted gases reach the scrubber 18 to ensure solution of total nitrogen oxide content in the sulfuric acid as previously described. However, the flue gas side stream leaving the catalytic stripper contains an excess of nitrogen oxides equal to the amount of nitrogen oxides in the original flue gas, less what is carried out in the flue gas exiting the scrubber. This excess is recovered as nitric acid by scrubbing a portion of the stripper gas effluent with water in the nitric acid absorber 26 according to the reaction:

$$3NO_2 + H_2O \rightarrow 2HNO_3 + NO \qquad (4)$$

Since the absorption of nitrogen dioxide does not occur efficiently at high temperatures, the stripper gas effluent side stream must be cooled by cooling unit 24 before it enters the nitric acid absorber. Preferably it is cooled to about 100° F. The nitric oxide formed according to reaction 4 is mixed with the incoming flue gas.

The following example illustrated the preferred mode of treating flue gases according to the invention using the system shown in the drawing. The catalytic stripper comprised a column filled with activated charcoal having a particle size in the range of 2,000–5,000 microns. The system was operated at atmospheric pressure.

EXAMPLE

A flue gas was supplied to line 2 at a rate of 20 standard cubic feet per minute (SFCM) and a temperature of 300° F. The composition of the entering flue gas is set forth in Table 1 below. Additionally $NO_2$ is introduced to reactor 4 via line 11 at the rate of 0.12 SFCM until such time as recycle $NO_2$ and NO begin to be fed into the line 2 via lines 12 and 35 from the nitric acid absorber and stripper 10. The flue gas feed was split so that 10 percent was delivered to the catalytic stripper and the remainder was delivered to reactor 4. The heat exchangers 8 and 16 and cooling unit 24 comprised water jackets surrounding lines 6, 14 and 12 respectively. Cooling water was circulated through heat exchanger 8 so as to cool the side stream of flue gas to 250° F. before it entered the stripper. The side stream left the catalytic stripper at a temperature of 250° F. and was cooled by cooler 24 to a temperature of 100° F. before entering the nitric acid scrubber 26 where it was scrubbed with 70° F. water. The gas leaving the nitric acid absorber had a temperature of about 100° F. Since some oxidation of $SO_2$ in the flue gas commences as soon as it was contacted with $NO_2$ in the side stream flue gas from the nitric acid absorber, the flue gas was at a temperature above 300° F. when it entered reactor 4. As a result of the further oxidation therein, the reacted gases had a temperature of about 340° F. on leaving reactor 4. This was lowered to about 250° F. by heat exchanger 16 before the gases entered scrubber 18. In the latter the reacted flue gases were scrubbed with 80 percent sulfuric acid recycled from the catalytic stripper at a temperature of 250° F. The scrubbed reacted flue gases left scrubber 18 and were vented to the atmosphere at a temperature of 250° F. The nitrose exited scrubber 18 and sulfuric acid exited stripper 10 at the same temperature of 250° F. The sulfuric acid passed from stripper 10 through a filter 34 for recovery of fly ash. The filter cake recovered from filter 34 was 60 percent solids. The amount of sulfuric acid (80 percent concentration) removed as product from the denitrated acid leaving stripper 10 was substantially what was formed in the reactor 4. The materials balance for this run is set forth in Table 1 below in terms of pounds based upon 1,000 pounds of entering flue gas.

TABLE 1

| Stage | $CO_2$ | $H_2O$ | $SO_2$ | $O_2$ | $N_2$ |
|---|---|---|---|---|---|
| In from Stack | 215 | 44 | 6.4 | 30 | 702 |
| Gas to Stripper | 21.5 | 4.4 | 0.64 | 3.0 | 70.2 |
| Gas from Stripper | 21.5 | 3.97 | — | 1.18 | 70.2 |
| Gas to $HNO_3$ Absorber | 215 | 3.97 | — | 1.18 | 70.2 |
| Gas from $HNO_3$ Absorber | 21.5 | 3.97 | — | 1.18 | 70.2 |
| Water to $HNO_3$ Absorber | — | 1.03 | — | — | — |
| Product $HNO_3$ (52%) | — | 0.89 | — | — | — |
| Gas to Reactor | 215 | 43.57 | 5.76 | 28.18 | 702 |
| Gas to Scrubber | 215 | 41.95 | — | 28.18 | 702 |
| Gas to Stack | 215 | 39.75 | — | 28.18 | 702 |
| Acid to Scrubber | — | 716 | — | — | — |
| Acid from Scrubber | — | 718.21 | — | — | — |
| Acid from Stripper | — | 718.5 | — | — | — |
| Acid from Filter | — | 718.23 | — | — | — |
| Cake from Filter | — | 0.27 | — | — | — |
| Product $H_2SO_4$ (80%) | — | 2.23 | — | — | — |

| Stage | $H_2SO_4$ | Ash | $NO_2$ | NO | Total |
|---|---|---|---|---|---|
| In from Stack | — | 2.0 | 0.06 | 0.54 | 1,000 |
| Gas to Stripper | — | 0.2 | 0.006 | 0.054 | 100 |
| Gas from Stripper | — | −10.48 | — | — | 107.33 |
| Gas to $HNO_3$ Absorber | — | — | 10.48 | — | 107.33 |
| Gas from $HNO_3$ Absorber | — | — | 9.42 | 0.23 | 106.50 |
| Water to $HNO_3$ Absorber | — | — | — | — | 1.03 |
| Product $HNO_3$ (52%) | — | — | 0.97 | — | 1.86 |
| Gas to Reactor | — | 1.8 | ($HNO_3$) 9.43 | 0.75 | 1,006.49 |
| Gas to Scrubber | 8.82 | 1.8 | 5.28 | 3.45 | 1,006.48 |
| Gas to Stack | — | — | 0.091 | 0.059 | 985.08 |
| Acid to Scrubber | 2864 | — | 0.053 | 0.034 | 3580.087 |
| Acid from Scrubber | 2,872.82 | 1.8 | 5.24 | 3.43 | 3,601.50 |
| Acid from Stripper | 2,873.8 | 2.0 | 0.053 | 0.034 | 3,594.387 |
| Acid from Filter | 2,872.74 | — | 0.053 | 0.034 | 3,591.057 |
| Cake from Filter | 1.06 | 2.0 | — | — | 3.33 |
| Product $H_2SO_4$ | 8.74 | — | — | — | 10.97 |

Essentially the flue gas effluent vented to the atmosphere via line 20 was free of oxides of sulfur and contained less than 20 percent by volume of the nitrogen oxides in the raw flue gas.

As seen from the foregoing example the process requires no heat input (in fact, overall it is exothermic). Moreover, a minimum of cooling water is required. Therefore, the process has a relatively low operating cost. The sulfuric acid product, of course, can be processed further to attain increased concentration.

Of course, the foregoing example is intended to be merely illustrative of the process as applied to flue gases and it is to be understood that the process may be practiced otherwise than as described above. Thus more or less than 10 percent of the flue gas may be passed to the stripper via line 6 and the operating temperatures may be adjusted up or down according to the temperature of the flue gas, the amounts of nitrogen and sulfur oxides in the flue gas feed, changes in total system pressures, etc. Similarly a different oxidizing catalyst may be used in the stripper in place of activated charcoal (which term includes activated carbon). Also, the side stream of flue gas supplied via line 6 may be omitted and the molecular oxygen required for the catalytic oxidation reaction may be supplied by feeding oxygen or some other suitable oxygen containing gas, such as air, directly to stripper 10. This further limits the amount of fly ash that can enter the stripper from the flue gas. Obviously the process is applicable to flue gases from different sources such as oil or coal-burning power plants, smelters, steel mills and other industrial plants.

Although the process as above-described can be used to produce sulfuric acid on a commercial scale from flue gases which constitute a dilute source of $SO_2$, it also may be used for large scale production of sulfuric acid starting with more concentrated sources of $SO_2$ as can be obtained by the burning of sulfur or pyrites. However, there are three major differences in the feed gas to be considered when using the process described above to make sulfuric acid from sulfur or pyrite burner off-gases: the gas is dry, far more concentrated in $SO_2$, and its temperature is typically about 1,600° F. Although these differences require modification of the process as described above, the catalytic stripper is still essential and the modified process with its definite advantages of higher economy and higher strength acid would not be possible without the concepts inherent in this invention.

Referring now to FIG. 2, the illustrated system includes substantially the same component stages as FIG. 1 except that (a) the side stream line 6 is omitted and molecular oxygen, preferably in the form of air, is supplied directly to stripper 10 and (b) the $NO_2$-bearing gas from stripper 10 flows directly into the line 2, and (c) a cooling unit 36 is used to cool the acid removed from stripper 10. Any required dust separation is preferably accomplished before the $SO_2$-bearing feed gas is supplied to line 2. The reason that the effluent gas from stripper 10 is returned directly to the line 2 is that there are no excess nitrogen oxides to manufacture nitric acid. Additionally, because the $SO_2$-bearing feed gas from the sulfur or pyrites burner (not shown) is at a relatively high temperature, typically in the order of 1,600° F., it is necessary to cool the feed gas by means of a cooler 38 before it is fed into the reactor 4 since high temperatures cause a slowdown in the $SO_2$ oxidation reaction. This decrease in reaction rate is due to the extensive dissociation of nitrogen dioxide to nitric oxide at elevated temperatures. At a temperature of about 1,600° F.

the $NO_2$ supplied to the reactor would be about 95 percent dissociated into NO which almost completely stop the $SO_2$ oxidation reaction. In addition the high temperature would cause the recycle acid to be heated up and, unless the acid were cooled, there would be a continued buildup of heat in the system that would make it difficult to absorb the oxides of nitrogen and the sulfuric acid mist in the scrubber 18. Since the heat must be removed somewhere in the system, it is preferred to do it before the nitrogen dioxide is introduced into the main gas stream. Preferably, the heat is removed from the system by converting it to electrical power, in which case the cooler 38 is a heat exchanger providing steam for a steam turbine electric power generator.

It is to be noted also that the high concentration of $SO_2$ in the feed gas will produce a large exotherm on reaction with $NO_2$ in the reactor which creates more heat that must be removed from the system. This additional heat removal may be accomplished by effluent cooler 16 and/or by cooling reactor 4 or scrubber 18. Cooling reactor 4 or scrubber 18 may be achieved by mounting cooling coils therein and circulating a cooling fluid such as room temperature water through the cooling coils.

A further feature of the system of FIG. 2 is provision of means for adding a controlled amount of water to the process. As noted above, the feed gas from a sulfur or pyrites burner is dry. By way of example, the feed gas from a typical pyrites burner may contain 8% $SO_2$, 10% $O_2$, 80% $N_2$ and 2% $H_2O$. This low water content is not sufficient for the production of sulfuric acid, so water must be added somewhere in the system in an amount sufficient to produce sulfuric acid. This additional water may be supplied to the reactor 4 as in the conventional Lead Chamber process, or to the scrubber 18 as shown in FIG. 2.

By controlling the amount of added water so that there is no excess water in the system, the modified process carried out in the system of FIG. 2 is free of the acid strength and temperature limitations mentioned above that characterize the process carried out in the system of FIG. 1. Since no water has to be evolved from the scrubber 18 there is no need to maintain its temperature at any specific level (for flue gas applications, the temperature had to be kept at the point where the vapor pressure of water over the incoming acid equaled the partial pressure of water in the influent gas to the scrubber). Hence the scrubber 18 can now be operated at substantially lower temperatures (e.g., 80° F.) and higher acid concentrations (e.g., 98 percent or higher). Furthermore, since there is no difficulty in removing the oxides of nitrogen from the effluent nitrose from the scrubber due to the catalytic oxidation of the oxides of nitrogen as discussed above, the stripper also can be operated at lower temperature and thus, higher acid concentration. Thus, this modification of the new process allows the production of commercial grades of sulfuric acid (93–98 percent). In comparison with the conventional Lead Chamber process, this modification of our process offers the definite advantages of higher economy and higher acid strength.

Table II below sets forth a materials balance (in terms of pounds based upon 1,000 pounds of feed gas) for the system of FIG. 2 operated with an $SO_2$ feed gas generated by burning sulfur. In this example the feed gas exiting cooler 38 has a temperature of 300° F. and the incoming air supplied to stripper 10 has a temperature of 80° F. (and a humidity at that temperature of 40 percent), the acid exiting cooler 36 has a temperature of about 80° F. The weight ratio of scrubbing acid to feed gas is 4:1.

TABLE II

|  | $H_2O$ | $SO_2$ | $O_2$ | $N_2$ | $SO_3$ |
|---|---|---|---|---|---|
| Gas from Sulfur Burner | 0.112 | 202 | 101 | 687 | 10 |
| Air to Stripper | 2.4 | — | 55.7 | 183.5 | — |
| Gas from Stripper | — | — | 5.1 | 183.5 | — |
| Gas from | — | — | — | — | — |
| $NO_2$ makeup |  |  |  |  |  |
| Gas to Reactor | 0.112 | 202 | 106.1 | 870.5 | 10 |
| Gas from Reactor | — | — | 106.1 | 870.5 | 262.0 |
| Gas to Stack | — | — | 106.1 | 870.5 | — |
| Water to Scrubber | 81.1 | — | — | — | — |
| Acid to Scrubber | 280 | — | — | — | — |
| Acid from Scrubber | 301.8 | — | — | — | — |
| Acid from Stripper | 304.2 | — | — | — | — |
| Product acid. | 24.2 | — | — | — | — |

|  | $H_2SO_4$ | $NO_2$ | NO | Total |
|---|---|---|---|---|
| Gas from Sulfur Burner | — | — | — | 1,000.1 |
| Air to Stripper | — | — | — | 241.6 |
| Gas from Stripper | — | 290.593 | — | 479.2 |
| Gas from | — | 0.407 | — | 0.407 |
| $NO_2$ makeup |  |  |  |  |
| Gas to Reactor | — | 291 | — | 1,479.2 |
| Gas from Reactor | 0.61 | 145.5 | 94.7 | 1,479.4 |
| Gas to Stack | — | 0.0887 | 0.0578 | 976.7 |
| Water to Scrubber | — | — | — | 81.1 |
| Acid to Scrubber | 3,720 | 1.339 | 0.871 | 4,002.2 |
| Acid from Scrubber | 4,041.0 | 146.7 | 95.5 | 4,585.0 |
| Acid from Stripper | 4041.0 | 1.454 | 0.946 | 4,347.6 |
| Product acid. | 321.0 | 0.115 | 0.075 | 345.4 |

Although the invention has been described in Examples I and II as operating at atmospheric pressure, it may also be practiced at higher or lower pressures.

It is understood that some sulfur acid may condense in reactor 4. If this tends to occur, provision may be made for removing the condensed acid from the reactor and introducing it to the scrubber 18.

As used herein, the term "flue gas" is intended to embrace any $SO_2$-containing gas produced by combustion of natural or synthetic fuels or incineration of refuse, and $SO_2$-bearing waste gases from industrial plants or smelters.

As used herein, the term "molecular oxygen gas" denotes a gas consisting wholly or partly of oxygen, e.g., air.

As indicated above other oxidizing catalysts may be used in stripper 10 in place of activated charcoal. However, it is essential that the particular catalyst be acid resistant.

It also is to be understood that the reactor, scrubbing and stripper chambers may take various structural forms well known in the art. Still other modifications will be obvious to persons skilled in the art.

We claim:

1. A method of producing acid from a feed gas that contains sulfur dioxide, said method comprising: introducing nitrogen dioxide to said feed gas and reacting the sulfur dioxide in said gas with said nitrogen dioxide and water vapor so as to produce sulfuric acid and nitric oxide, said nitrogen dioxide being introduced at a rate such that after said reaction said gas contains nitric oxide and nitrogen dioxide in substantially equimolar amounts, thereafter passing the reacted gas to a scrubber, scrubbing said reacted gas with sulfuric acid scrubbing agent so as to produce a nitrose comprising a solution of nitrosyl sulfuric acid in said scrubbing agent, separating said nitrose from said scrubber and passing said nitrose to a catalytic stripper containing an oxidizing catalyst, contacting said nitrose with said catalyst and a molecular oxygen gas so as to produce sulfuric acid and nitrogen dioxide reaction products by oxidation of the nitrosyl sulfuric acid in said nitrose, separately recovering from said stripper a sulfuric acid liquid phase and a gas phase comprising said nitrogen dioxide reaction product, introducing at least part of said nitrogen dioxide reaction product to additional feed gas for reaction with additional sulfur dioxide and water vapor, recovering part of said sulfuric acid liquid phase as product and using the remainder of said sulfuric acid liquid phase for scrubbing as above-described to produce additional nitrose.

2. Method according to claim 1 wherein part of said nitrogen dioxide reaction product is reacted with additional feed gas and the rest is converted to nitric acid.

3. Method according to claim 1 wherein said feed gas is produced by burning sulfur or pyrites.

4. Method according to claim 1 wherein said feed gas is a flue gas.

5. Method according to claim 1 wherein said catalyst is activated charcoal.

6. Method according to claim 1 wherein said molecular oxygen gas is a sidestream of said feed gas.

7. Method according to claim 1 wherein the temperature of the reacted gas entering said scrubber is substantially the same as the temperature of the sulfuric acid scrubbing agent.

8. Method according to claim 1 wherein said scrubber and stripper are operated at substantially the same temperature.

9. Method according to claim 1 wherein said scrubber is operated at a temperature in the order of 250° F.

10. Method according to claim 1 wherein said scrubber is operated at a temperature at which the vapor pressure of water over the sulfuric acid scrubbing agent is substantially equal to the partial pressure of water in the reacted feed gas introduced to said scrubber.

11. Method of claim 1 wherein said sulfuric acid scrubbing agent has a concentration of at least about 80 percent.

12. Method of claim 1 wherein said scrubber is operated at a temperature below about 400° F.

13. Method of claim 1 wherein said sulfuric acid scrubbing agent has a temperature of about 250° F. and said feed gas has a temperature of about 300° F. prior to introduction of nitrogen dioxide, and further including cooling said feed gas after reaction with nitrogen dioxide so that it enters said scrubber at approximately the same temperature as said sulfuric acid scrubbing agent.

14. A method of producing sulfuric acid from a flue gas containing sulfur dioxide, nitric oxide and water vapor comprising reacting nitrogen dioxide with said sulfur dioxide and water vapor so as to produce a reacted flue gas containing sulfuric acid and equimolar amounts of nitric oxide and nitrogen dioxide, scrubbing said reacted flue gas with hot concentrated sulfuric acid so as to produce a a solution comprising nitrosyl sulfuric acid dissolved in said hot acid, venting the scrubbed reacted flue gas and passing said solution to a catalytic stripper containing an oxidizing catalyst, introducing a molecular oxygen gas to said stripper, oxidizing nitrogen oxide values of the nitrosyl sulfuric acid in said solution by reaction with said molecular oxygen gas in contact with said catalyst so as to produce liquid sulfuric acid and a gaseous effluent comprising nitrogen dioxide, using the nitrogen dioxide in said gaseous effluent for reaction with sulfur dioxide in additional flue gas, recovering part of the sulfuric acid from said stripper as product and using the remainder of said sulfuric acid to scrub additional reacted flue gas.

15. A system for desulfurizing a flue gas containing sulfur dioxide and water vapor, said system comprising a reaction chamber, means for introducing nitrogen dioxide and a first stream of said raw flue gas to said reaction chamber so that said sulfur dioxide, water vapor and nitrogen dioxide can react in said reaction chamber to produce sulfuric acid, nitric oxide and nitrogen dioxide, a sulfuric acid scrubber, means for introducing the effluent from said reaction chamber to said scrubber, means for introducing sulfuric acid to said scrubber to scrub out nitrosyl sulfuric acid from said effluent and form a nitrose, means for venting said scrubbed effluent, a catalytic stripper containing an oxidizing catalyst for promoting oxidation of said nitrosyl sulfuric acid to form nitrogen dioxide and sulfuric acid, means for introducing the nitrose from said scrubber to said stripper, means for introducing a second stream of said flue gas to said stripper to oxidize said nitrosyl sulfuric acid, means for recovering a gaseous effluent from said stripper, means for recovering said gaseous effluent from said stripper and delivering at least part of the same to said reaction chamber, means for recovering sulfuric acid from said stripper and delivering part of said recovered sulfuric acid to product recovery means and the remainder of said recovered sulfuric acid to said means for introducing sulfuric acid to said scrubber.

16. A system according to claim 17 further including means for treating said gaseous effluent before it is delivered to said reaction chamber so as to convert at least part of any nitrogen dioxide in said gaseous effluent to nitric acid, and means for recovering said nitric acid.

17. A system according to claim 15 wherein said catalyst is activated charcoal.

18. In a process comprising the steps of reacting a feed gas containing $SO_2$ with nitrogen dioxide and water vapor to form sulfuric acid and oxides of nitrogen, and scrubbing the reacted feed gas with sulfuric acid to produce a solution of nitrosyl sulfuric acid in sulfuric acid, the improvement comprising catalytically oxidizing said nitrosyl sulfuric acid by reaction with oxygen in the presence of an oxidizing catalyst to form liquid $H_2SO_4$ and a gaseous effluent comprising $NO_2$, and using at least part of the $NO_2$ in said gaseous effluent for reaction with an additional quantity of said feed gas.

19. In a process for producing sulfuric from a $So_{gas\ containing}$ $so_2$ characterized by the following sequentially occurring reactions:

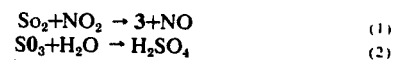

and recovery of a solution of $HNSO_5$ in $H_2SO_4$, the improvement comprising contacting said solution with molecular oxygen gas in the presence of a solid oxidizing catalyst so that $H_2SO_4$ and $NO_2$ products are produced by oxidation of said $HNSO_5$, and separating and recovering said $NO_2$ product as a gas.

20. Method according to claim 1 wherein the reacted feed gas is scrubbed with sulfuric acid scrubbing agent at a temperature of at least 80° F.

21. A method of producing sulfuric acid from a feed gas that contains sulfur dioxide, said method comprising: introducing nitrogen dioxide to said feed gas and reacting the sulfur dioxide in said feed gas with said nitrogen dioxide and water vapor so as to produce sulfuric acid and nitric oxide, said nitrogen dioxide being introduced at a rate such that after said reaction said feed gas contains nitric oxide and nitrogen dioxide in substantially equimolar amounts, thereafter passing the reacted feed gas to a scrubber operated at a temperature in the range of about 250° F. to about 400° F., scrubbing said reacted feed gas with sulfuric acid scrubbing agent so as to produce a nitrose comprising a solution of nitrosyl sulfuric acid in said scrubbing agent, separately removing said nitrose and the scrubbed reacted feed gas from said scrubber and passing said nitrose to a catalytic stripper containing an oxidizing catalyst that essentially comprises activated charcoal, reacting said nitrose with a molecular oxygen gas in contact with said catalyst so as to produce sulfuric acid and nitrogen dioxide reaction products from said nitrosyl sulfuric acid, separately recovering from said stripper (1) liquid sulfuric acid having a temperature in the range of 250° F. to 400° F. and (2) a gaseous effluent comprising said nitrogen dioxide reaction product, introducing at least part of said gaseous effluent to additional feed gas for reaction of its nitrogen dioxide content with additional sulfur dioxide and water vapor, recirculating a portion of said liquid sulfuric acid to said scrubber to scrub additional reacted feed gas, and recovering the remainder of said liquid sulfuric acid as product.

22. Method according to claim 21 wherein part of said nitrogen dioxide reaction product is contacted with water to produce nitric acid and said nitric acid is recovered as an additional product.

23. Method according to claim 21 wherein said scrubber is operated at a temperature at which the vapor pressure of water over the sulfuric acid scrubbing agent is substantially equal to the partial pressure of water in the reacted feed gas introduced to scrubber.

24. Method according to claim 21 wherein said sulfuric acid scrubbing agent and said sulfuric acid reaction product have a concentration in the range of about 80 percent to about 93 percent.

* * * * *

UNITED STATES PATENT OFFICE
CERTIFICATE OF CORRECTION

Patent No. 3,649,188    Dated March 14, 1972

Inventor(s) Bertram Keilin and Arthur Walitt

It is certified that error appears in the above-identified patent and that said Letters Patent are hereby corrected as shown below:

Column 6, Line 10 insert --(80%)-- after "Product $H_2SO_4$";

Column 8, Line 47, Claim 1, before --acid-- insert "sulfuric";

Column 9, Line 74, Claim 16, substitute --15-- for "17";

Column 10, Lines 17-18, Claim 19, delete --So gas containing $SO_2$-- and substitute "feed gas containing $SO_2$"; and Column 10, Line 20, Claim 19, delete --3+No-- and substitute "$SO_3$ + NO".

Signed and sealed this 29th day of August 1972.

(SEAL)
Attest:

EDWARD M.FLETCHER,JR.                ROBERT GOTTSCHALK
Attesting Officer                    Commissioner of Patent